July 6, 1926.
F. M. KENNEDY ET AL
1,591,631
TENSION METER
Filed Jan. 18, 1926
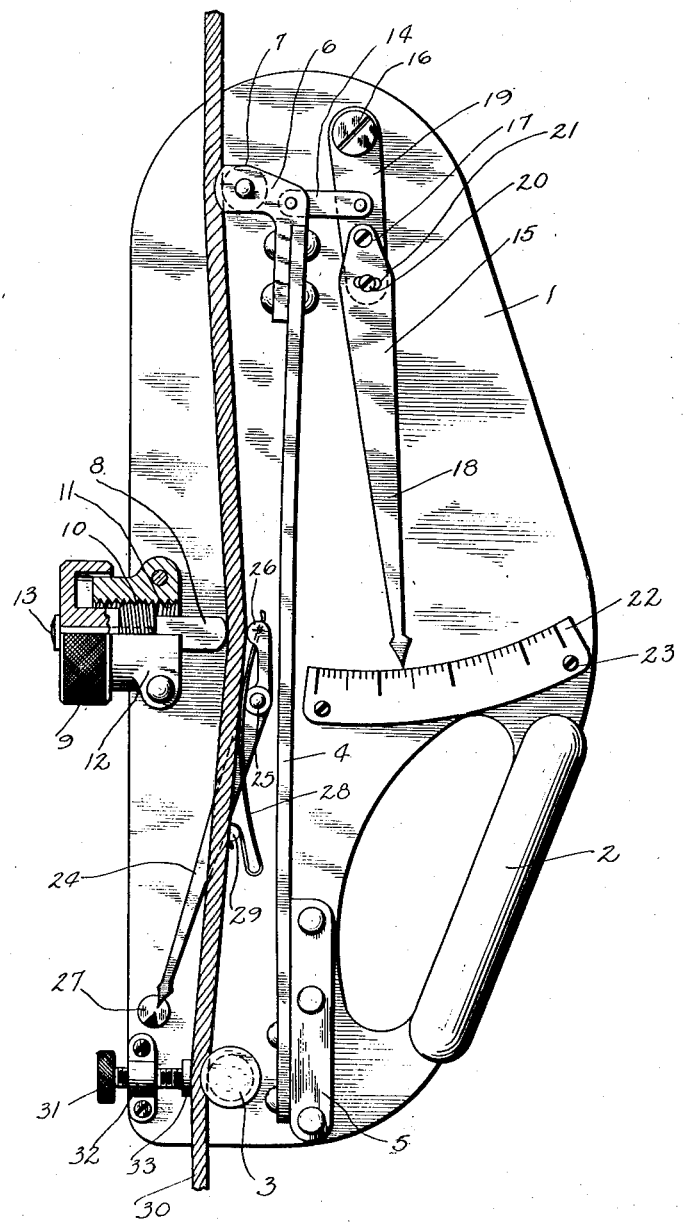
INVENTORS
FRANK M. KENNEDY
JOHN F. BOLGIANO
BY
*Robert A. Young*
ATTORNEY Patented July 6, 1926.

1,591,631

UNITED STATES PATENT OFFICE.

FRANK M. KENNEDY AND JOHN F. BOLGIANO, OF DAYTON, OHIO.

TENSION METER.

Application filed January 18, 1926. Serial No. 82,008.

This invention relates to devices for determining the tensile stress of wires, ropes, belts or cables in the case where stretched tension members are deflected by being forcibly caused to bear up against three unaligned guide members.

The primary object of the invention is the provision of a tension meter of this character, which will be suitable for use with any sized cable without any calculations being necessary in computing the stresses in these various sized cables and without need for knowing the exact size of the cable.

A further object of the invention is the provision of three cable contact members upon a supporting plate with means for mounting one of the members resiliently upon a spring so that it may be deflected in accordance with the stress in the cable. An indicating pointer is pivoted on the plate and operated by movements of the movable cable contact member, so that the stress is indicated directly upon a scale upon the plate. The cable is adjusted to the proper amount by another one of the cable contact members which is manually operable, so as to bend the cable a proper amount, this amount being determined by an indicating pointer which contacts with the same side of the cable as two of the cable guide members; and the proper amount of deflection is indicated by this indicating pointer which registers with an index mark upon the plate when the proper deflection is obtained.

Further objects and advantages of our invention will appear as the description of the preferred embodiment of the same is set forth in the following description and claims.

In the drawings, the figure is a plan view of the tension meter. Referring more particularly to this figure by reference numerals, the plate 1 upon which the various parts of the instrument are mounted is of suitable shape and is provided with a handle portion 2. Upon this plate is mounted a cable contact or guide member 3 which may be provided with a suitable roller or pad if desired. A cantilever leaf spring 4 is anchored by the plate 5, and this spring carries a bracket 6 at its free end in which is mounted the cable contact or guide member 7. Between the two members 3 and 7 is an intermediate cable contacting member 8 which may be manually adjusted by means of the thumb screw 9 which is provided with a threaded portion 10, engaging internal threads 11, in the casting 12. Pin 13 through the knurled end 9 holds the adjustable contact member 8, so that it may be moved back and forth within a suitable slot provided in opposite sides of the casting 12.

The end of spring 4 is attached by a link 14 to an indicating lever or pointer 15 which is pivoted upon the plate by a pin 16. A suitable calibration adjustment is provided by the manner in which the end 18 of the pointer is pivoted at 17 to the base portion 19 of the pointer. An adjusting screw 20 is mounted within a slot 21 provided in the end portion 18 of the pointer, so that the proper calibration of the instrument may be obtained. The pointer 18 cooperates at its end with an indicating scale 22 which is fixed by means of the screws 23 upon the plate 1 of the instrument.

In order to take care of various sized cables without the necessity of obtaining or knowing the exact size of the cable, the cable must be deflected through the same degree of movement in order for the scale 22 to properly indicate the correct stress in the cable. A pointer 24 is, therefore, provided upon the pivot mount 25 on the plate and this pointer is provided with a continuation 26 which contacts with the cable at a point opposite to the contact member 8. It will be understood that this point 26 which contacts with the cable may be at any desired point between the two cable contact members 3 and 7. The end of this pointer 24 cooperates with an index mark 27 on the plate and when the cable is deflected through the proper predetermined amount, the end of the pointer 24 will be adjacent to this index 27. The point 26 on the continuation of the pointer 24 is maintained in contact with the cable with a slight pressure by means of a leaf spring 28 which is attached at one end to the pin 29 fixed in the plate 1 of the instrument.

The cable, itself, indicated at 30 is placed in contact with the two contact members 3 and 7, and then deflected by means of the thumb screw 9 and cable contacting member 8 until the pointer 24 registers with the index 27. The cable may be then fixed to the instrument by means of the thumb screw 31 which is threaded within a cap 32 and which bears at 33 against the cable, so that the instrument is prevented from sliding along the cable. The proper stress in the cable is then indicated directly upon the scale 22 by means of the indicating pointer, regardless of the size of the cable, since the deflection of the cable from a straight line is a measure of the stress of the cable regardless of its size.

It will, therefore, be understood that we have provided an instrument which is simple in construction, and which is accurate to a remarkable degree and capable of use under varying conditions and uses. We are aware that various modifications may be made within the scope of our invention, and we do not intend to be limited to the precise construction which has been chosen herein for purposes of illustration.

We claim:

1. In a tension measuring instrument, in combination, three guide members not disposed in a straight line, means for moving one of said members to accommodate different sized cable or wire, an indicator operably connected to one of said members for measuring the tension in the cable or wire, and an indicator operated by the cable or wire for determining the position of another of said members.

2. In a tension measuring instrument, in combination, a pair of guide members for contacting one side of a wire or cable, an intermediate third guide member for contacting the other side of said wire or cable, means for moving one of said members to bend the wire or cable, a lever operated directly by movement of one of said members to indicate the tension in the cable and a pointer for registering the proper movement of said means, said pointer being directly contacted by said wire or cable for the purpose described.

3. In a tension meter, in combination, a supporting plate, an end guide member on said plate, an adjustable intermediate guide member on said plate, and an end guide member yieldingly mounted on said plate, an indicator operated by said last guide member, and an indicator operated by said cable for determining the amount of adjustment of said intermediate guide member.

4. A tension meter comprising a supporting plate, two end cable contact members and an intermediate contact member mounted on said plate, a spring arm on said plate supporting one of said end members, a pointer, a link connecting said arm and pointer, a scale for said pointer to indicate the tension in the cable, means for adjusting said intermediate member and means for determining the amount of adjustment required for different sized cables.

5. A tension meter comprising a supporting plate, two end cable contact members and an intermediate contact member mounted on said plate, a cantilever spring arm fixed to said plate at one end and supporting one of said end members, a pointer pivoted on said plate, a link connecting the free end of said arm and said pointer, a scale on said plate for said pointer to indicate the tension in the cable, a hand screw for adjusting intermediate member and means pivoted on said plate for determining the amount of adjustment required for different sized cables.

6. In a tension meter, in combination, a supporting plate, two end cable contact members and an intermediate adjustable contact member thereon, a spring arm on said plate supporting one of said end members, a pointer pivoted on a plate, a link connecting said arm and pointer, a scale on the plate cooperating with said pointer to indicate the tension in the cable, means for adjusting the intermediate member and a pointer contacting with the cable on the opposite side thereof from the intermediate member to indicate when the deflection caused in the cable by the intermediate member is of the proper amount.

7. A tension meter comprising a supporting plate, two end cable contact members and an adjustable intermediate contact member mounted on said plate, a cantilever spring arm fixed at one end to said plate, and its other end supporting one of said end members, a pointer pivotally mounted on the plate, a link connecting the free end of said arm to the pointer, a scale mounted on the plate and cooperating with the pointer to indicate the tension in the cable, a hand screw for adjusting intermediate member, a lever pivoted on the plate and contacting with the cable on the opposite side thereof from the intermediate member to indicate when the deflection caused in the cable is of the proper amount and spring means to maintain said lever against the cable.

In testimony whereof we affix our signatures.

FRANK M. KENNEDY.
JOHN F. BOLGIANO.